United States Patent [19]
Colvin

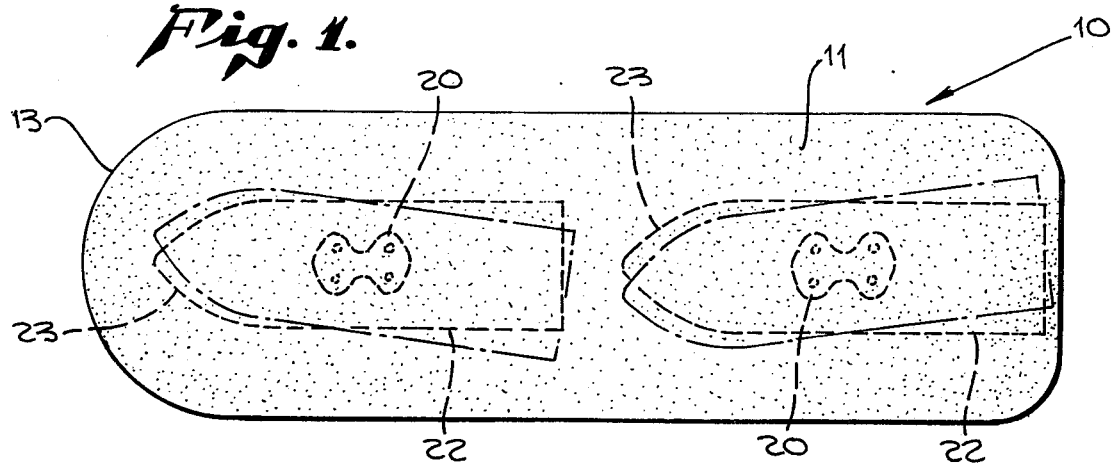
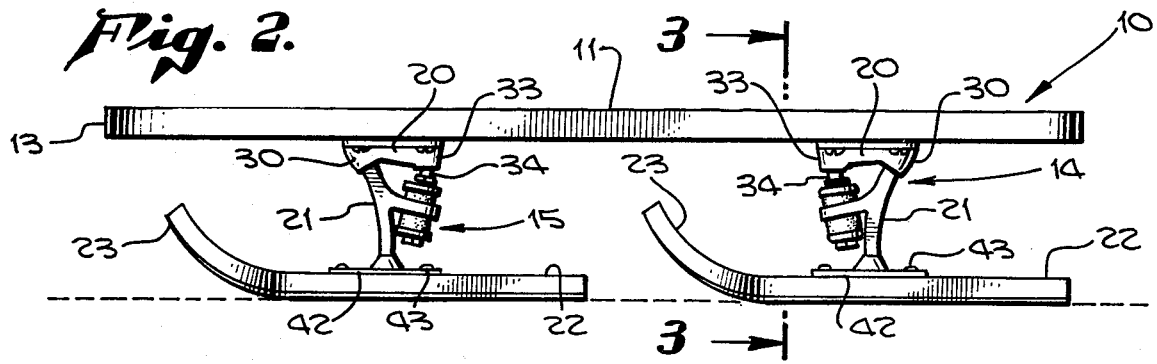
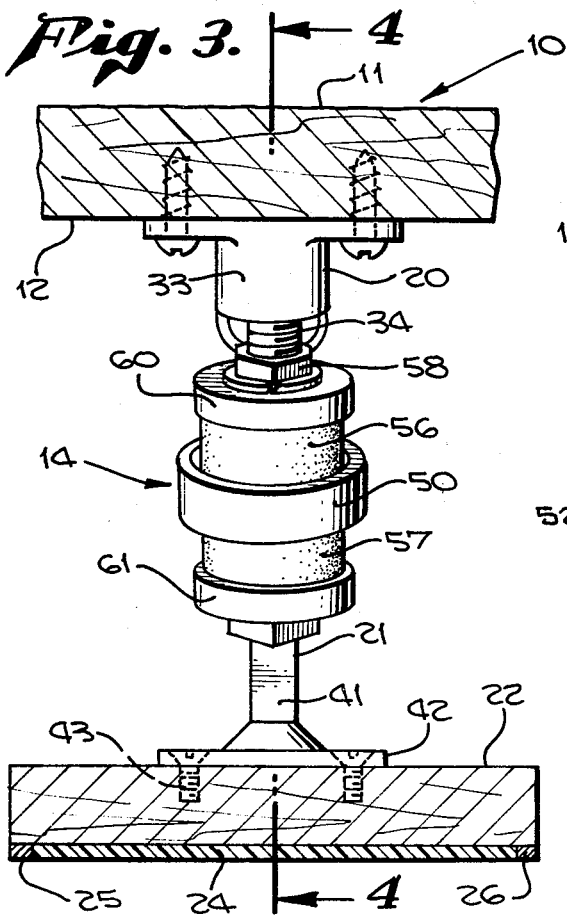
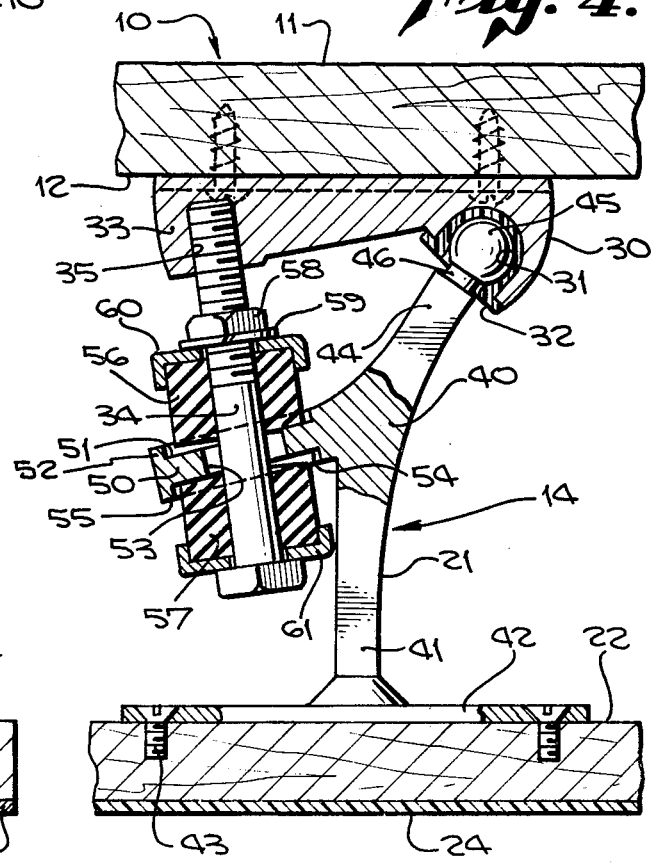

[11] 4,161,324
[45] Jul. 17, 1979

[54] SKI BOARD

[76] Inventor: Christopher R. Colvin, 201 Calle Conchita, San Clemente, Calif. 92672

[21] Appl. No.: 866,274

[22] Filed: Jan. 3, 1978

[51] Int. Cl.² .......................................... B62M 27/02
[52] U.S. Cl. .................................. 280/21 A; 280/7.14
[58] Field of Search ..................... 280/7.15, 7.12, 7.13, 280/7.14, 16, 21 R, 21 A

[56] References Cited
U.S. PATENT DOCUMENTS

| | | | |
|---|---|---|---|
| 1,592,419 | 7/1926 | Campbell | 280/16 |
| 1,900,108 | 3/1933 | Hedeen et al. | 280/16 UX |
| 3,203,706 | 8/1965 | Boyden | 280/7.12 |
| 3,526,412 | 9/1970 | Garcia | 280/16 |
| 3,711,108 | 1/1973 | Orozco et al. | 280/21 R |
| 4,036,506 | 7/1977 | Scheob | 280/21 A |
| 4,101,142 | 7/1978 | Turner | 280/21 R X |

*Primary Examiner*—Joseph F. Peters, Jr.
*Assistant Examiner*—Norman L. Stack, Jr.

[57] ABSTRACT

An item of sport equipment consists of a board broad enough to accomodate both feet of the rider on the upper side and long enough to have mounted on the under side two individual ski sections. Each ski section is provided with its own mounting midway between opposite ends of the ski section, the forward end of each ski section being tilted upward in a conventional fashion to ride over a snow surface. The mounting of each ski section is yieldable so that as the rider leans toward one side or the other, as in turning alignment of the ski sections shifts angularly following a turning arc in a corresponding direction.

6 Claims, 4 Drawing Figures

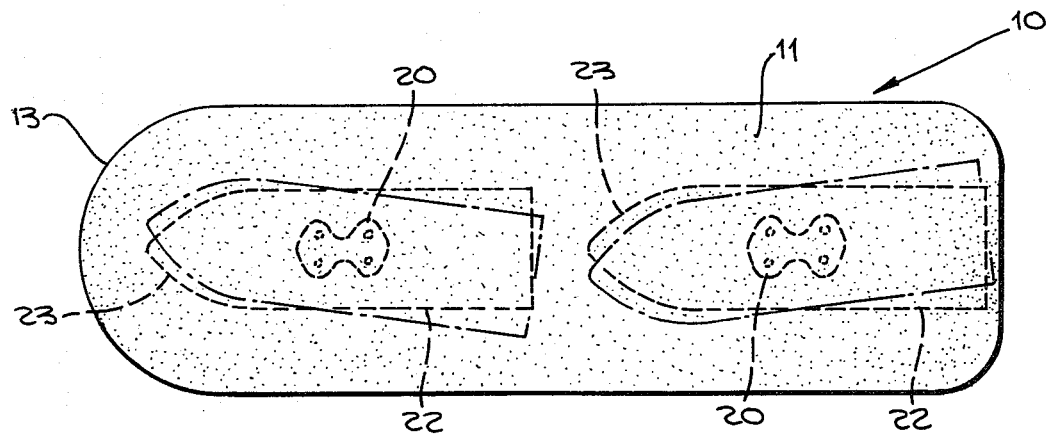

SKI BOARD

Traditionally, skiing on a snowy slope, two skis are provided for a rider, one for each foot. Although for straight travel down a slope no more than a modest amount of skill and ability may be needed, for making turns, either for the purpose of changing direction, avoiding an obstacle, or merely to vary the path of travel, additional skill is needed. Skills developed for turning, for whatever purpose, afford appreciable pleasure of accomplishment and expertise and are customarily quite widely sought.

A somewhat comparable circumstance is applied to skating, namely roller skating, from which has developed the currently popular skate boards where, instead of there being a vehicle for each foot, there is provided a single board or platform for both feet of the rider, the board being one riding on a single set of fore and aft pairs of wheels.

It is among the objects of the present invention to provide a somewhat comparable vehicle where runners replace wheels on a single board, arranged in such fashion that a rider can operate the board in such a manner as to change direction either toward the right or left at will.

Another object of the invention is to provide a new and improved item of sport equipment identifiable as a ski board, wherein two sliding supports are attached in fore and aft alignment to the underside of the board by means of a yieldable mounting such that by tilting the board toward one side or the other, the direction of travel of the board can be changed so as to curve toward the right or toward the left as the case may be.

Still another object of the invention is to provide a new and improved item of sports equipment identifiable as a ski board wherein the sliding supports are of the character of snow skis of a design and construction such that the skis are capable of gripping a snowy surface sufficiently to that when the board is manipulated by tipping or banking in one direction or another so as to turn the skis individually, the vehicle can be made to travel a desired curved path in one direction or the other.

Still further among the objects of the invention is to provide a sport vehicle identifiable as a ski board wherein the parts are made simple and rugged, and furthermore mounted in such fashion that the vehicle can be made to travel a snowy surface of any one of a variety of different characters with respect to depth of snow, slipperiness of surface, degree of compaction, moisture and similar variations such as might be generally encountered on a snowy slope.

With these and other objects in view, the invention consists of the construction, arrangement, and combination of the various parts of the device serving as an example only of one or more embodiments of the invention, whereby the objects contemplated are attained, as hereinafter disclosed in the specification and drawings, and pointed out in the appended claims.

FIG. 1 is a top plan view of the board with runners shown in phantom.

FIG. 2 is a side elevational view.

FIG. 3 is an end elevational view on the line 3—3 of FIG. 2.

FIG. 4 is a vertical cross sectional view on the line 4—4 of FIG. 3.

In an embodiment of the invention which has been chosen for illustrative purposes, there is shown a board or platform 10 long enough and wide enough for a rider to stand on with both feet either side by side or in force and aft alignment. The board has an upper face 11 and a lower face 12. Although the general shape of the board is somewhat arbitrary, the forward end 13 is curved, and for most conditions can be flat as shown and need not be upturned.

Attached to the lower face of the board 10 are two runner assemblies indicated respectively by the reference characters 14 and 15. The runner assemblies are identical except that they are positioned in opposite directions on the lower face of the board.

Each of the assemblies consists in the main of three parts, namely a saddle 10, a yoke 21 and a runner 22. In the chosen embodiment the runner is in the form of a snow ski having a relatively short body and an upturned tip 23 at the forward end. The lower or traction surface 24 of the runner 22 may have any one of a number of conventional forms, as, for example, being provided with corner strips 25 and 26 at the side edges and a specially prepared low friction mid-portion.

The runners herein made reference to have the form of skis. It is contemplated that for other types of surfaces, as, for example, clear ice, the runner could have the form of an ice skate runner.

The saddle 20 is provided with a tipped boss 30 at one end in which is a socket 31 large enough to accommodate a yieldable thrust washer 32. A somewhat flatter boss 33 at the opposite end provides a mounting for a post 34 which in practice consists of an exteriorly threaded bolt, adapted to threadedly engage an appropriate interiorly threaded bore 35 in the boss.

The yoke 21 consists primarily of a central column 40 having a vertical lower end 41 rigidly secured to a plate 42 as for example by a weldment. Rivets or screws 43 at respective corners of the plate may be employed for attaching the plate to the runner 22.

At an upper end 44 of the column, there is a rounded portion 45 which is adapted to be projected into the thrust washer 32 so that a shoulder 46 at the upper end 44 can bear upon an exposed face of the thrust washer.

For engagement with the post 34, here shown as a bolt, the yoke is provided with an oblique laterally extending steering arm 50.

On an upper side of the steering arm is a recess 51 surrounded by an annular rim 52, there being a central opening 53 in the bottom of the recess. On the underside of the steering arm is a second recess 54 surrounded by an annular rim 55. In the recess 51 is an a annular yieldable washer 56 cups 60 and 61 confine the respective washers 56 and 57. A similar annular yieldable washer 57 is located in the other recess 54. The post 34 extends through the washers and the central opening 53, and the assembly can be tightened in position by means of an appropriate nut 58 and lock washer 59.

In operation, the rider stands on the board 10 either with feed side by side or advanced one forward of the other, and commences travel, customarily down a slope. The runners 22, if they be skis, slide over the surface of the snow and the guide strips 25 and 26 bite into the surface.

When there is occasion to turn toward the right, the rider shifts his weight toward the right side of the board 10. This causes the forward runner 22 to angle in a clockwise direction. What happens with respect to the runner assembly is that the post 34 is tilted, the washers 56 and 57 yield, and the steering arm 50 is swung slightly in a clockwise direction, as viewed in FIG. 1.

Simultaneously the rounded portion 45 at the upper end 44 of the column 40 is free to move in the thrust washer 32 and its socket, the result being to rotate the ski 22 in the clockwise direction as noted.

Simultaneously, and because of the reverse positioning of the rear runner assembly, the rear ski 22 is rotated in a counter-clockwise direction. This is because the steering arm 50 extends forwardly of the respective column 40, the result being a tendency to move in reverse direction, namely counterclockwise direction as viewed in FIG. 1. As a result the two runners 22 trace a path in the same arc and the board makes a corresponding turn in direction toward the right.

For turning toward the left, the operation is merely reversed, by having the rider shift his weight toward the left of the board 10. On this occasion the runner 22 at the fore end is caused to rotate in a counter-clockwise direction, and the runner 22 of the aft runner assembly 15 is caused to rotate in clockwise direction. The two runners, therefore, on this occasion, travel in the same arcuate path, but toward the left.

To travel in a straight direction, the rider merely balances his weight on the board 10 so that the weight is evenly distributed on both sides and the two runner assemblies then proceed in a straight line fore and aft direction.

Although relatively short runners 22 in the form of skis are shown, it will be understood that runners of greater proportionate length may be preferable to accommodate different snowy conditions on a slope, in which even the board 10 will need to have its length increased by a corresponding amount.

Furthermore, should the surface, for example, be a hard surface such as ice, it is possible to meet such conditions to provide runners 22 which have narrow metallic cutting edges comparable to ice skates, other portions of the runner assemblies, however, being of the same construction as has been described in detail in the foregoing specification.

Although the equipment described may be expected to operate most readily on a slope, the dexterity of the rider may be such that, given a slight inpetus, the device may be manipulated on a substantially horizontal surface.

Having described the invention, what is claimed as new in support of Letters Patent is as follows:

1. A ski board for use as a sport vehicle to accommodate the feet of a rider comprising a relatively flat wide foot board having an upper face for the feet intermediate opposite ends and a lower face, a pair of respective foward and rearward runners of substantially equal length, said length being less than one-half the length of the board, and a mounting interconnecting each runner to the board at the lower face so that the runners are in force and aft alignment and one runner behind the other, the runners being at locations spaced from each other with the front of the forward runner no further forward than the front end of the board and the rear of the rearward runner no further rearward than the rear end of the board, each mounting comprising a saddle and a yoke, the saddle having a fore and and an aft end, there being a boss with a post thereon adjacent one end and a universal joint (socket) adjacent the other end, the saddle of one of said mountings having an attachment to the lower face of the board with the fore end forward and the saddle and the other mounting having an attachment to the lower face of the board with the fore end rearward, each said yoke comprising a column having a movable end in thrust engagement in said socket and an anchored end is fixed engagement with the respective runner intermediate opposite ends of the runner, said column having a transversely extending steering arm, and a yieldable connection between the steering arm and said post whereby pressure on one side or the other of the board effects a lateral shift of the steering arm and a corresponding change in direction of the runner relative to the board.

2. A ski board as in claim 1 wherein the anchored end of the column comprises a plate for attachment to the ski and a fixed connection anchoring said column in a position perpendicular to the plate.

3. A ski board as in claim 1 wherein the universal joint comprises a socket at the movable end of the column offset horizontally on one side of the anchored end and the connection of the steering arm with the post is offset horizontally on the opposite side of the anchored end.

4. A ski board as in claim 1 wherein the connection of the steering arm with the post is at a location intermediate opposite ends of the column.

5. A ski board as in claim 1 wherein the connection of the steering arm with the post is aft of the fore and aft center of the ski.

6. A ski board as in claim 1 wherein said yieldable connection comprises recesses back to back and opening outwardly in opposite directions, and a yieldable annular bushing in each recess, said post having a location extending through said recesses and said annular bushings and securing means acting between the post and the bushings, for holding said post connected in yieldable engagement with the steering arm.

* * * * *